United States Patent
Lee

(10) Patent No.: US 7,961,639 B2
(45) Date of Patent: Jun. 14, 2011

(54) METHOD AND APPARATUS FOR TRANSMITTING DATA IN POWER LINE COMMUNICATION NETWORK WHILE PREVENTING HIDDEN NODE PROBLEM

(75) Inventor: Joon-hee Lee, Gumpo-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 565 days.

(21) Appl. No.: 11/605,307

(22) Filed: Nov. 29, 2006

(65) Prior Publication Data

US 2007/0195812 A1    Aug. 23, 2007

(30) Foreign Application Priority Data

May 1, 2006   (KR) ................ 10-2006-0039286

(51) Int. Cl.
*G01R 31/08*   (2006.01)
*H04L 12/413*   (2006.01)
*H04J 3/16*   (2006.01)
(52) U.S. Cl. .................... 370/252; 370/447; 370/465
(58) Field of Classification Search .................. 370/328, 370/338, 445, 447, 462, 465, 470
See application file for complete search history.

(56) References Cited

U.S. PATENT DOCUMENTS

| | | | |
|---|---|---|---|
| 5,844,905 A | 12/1998 | McKay et al. | |
| 6,374,117 B1 * | 4/2002 | Denkert et al. | 455/522 |
| 7,184,407 B1 * | 2/2007 | Myles et al. | 370/242 |
| 7,321,614 B2 * | 1/2008 | Jacobsen et al. | 375/221 |
| 2005/0041616 A1 | 2/2005 | Ginzburg et al. | |
| 2008/0144493 A1 * | 6/2008 | Yeh | 370/230 |
| 2008/0144500 A1 * | 6/2008 | Chen et al. | 370/235 |
| 2009/0225682 A1 * | 9/2009 | Grote-Lopez et al. | 370/255 |

FOREIGN PATENT DOCUMENTS

| | | |
|---|---|---|
| KR | 10-2005-0052816 A | 6/2005 |
| KR | 10-2005-0057124 A | 6/2005 |
| KR | 10-2005-0122235 A | 12/2005 |

* cited by examiner

*Primary Examiner* — Nittaya Juntima
(74) *Attorney, Agent, or Firm* — Sughrue Mion, PLLC

(57) ABSTRACT

A method and apparatus are provided for transmitting data more efficiently between stations in a power line communication (PLC) network while preventing a hidden node problem. The method of transmitting data includes: detecting a hidden node in a network; and transmitting at least one of a request to send (RTS) command and a clear to send command (CTS) to the network before transmitting the data, if a hidden node is detected and a transmitting station a data packet having a size which is larger than a predetermined size. Using the method, interference of data transmissions and a low data throughput caused by the hidden node problem should be prevented.

8 Claims, 5 Drawing Sheets

METHOD AND APPARATUS FOR TRANSMITTING DATA IN POWER LINE COMMUNICATION NETWORK WHILE PREVENTING HIDDEN NODE PROBLEM

CROSS-REFERENCE TO RELATED PATENT APPLICATION

This application claims priority from Korean Patent Application No. 10-2006-0039286, filed on May 1, 2006, in the Korean Intellectual Property Office and U.S. Patent Application No. 60/775,802, filed on Feb. 23, 2006 in the U.S. Patent and Trademark Office, the disclosures of which are incorporated herein in their entirety by reference.

BACKGROUND OF THE INVENTION

1. Field of the Invention

Apparatus and methods consistent with the present invention relate to transmitting data more efficiently in network, and more particularly, to transmitting data between stations in a power line communication (PLC) network while preventing a hidden node problem.

2. Description of the Related Art

A PLC network technology method is one of a number of methods used to build a communication network for a home network. PLC network technology uses existing residential power lines. Accordingly, unlike Ethernet networks, PLC networks do not need additional wiring to be installed, and can be used in basements or areas that wireless networks cannot reach.

FIG. 1 is a schematic drawing illustrating data communication between a coordinator and stations in a PLC network. In FIG. 1, the dotted lined circle represents the communication range of a coordinator, the circle on the left represents the communication range of a station A, and the circle on the right represents the communication range of a station B.

Referring to FIG. 1, station A is outside the communication range of station B and station B is outside the communication range of station A. Accordingly, stations A and B are unable to detect each other's communication status. Thus, station B is a hidden node of station A, and station A is a hidden node of station B. Due to this fact, when stations A and B attempt to transmit data to the coordinator or other stations at the same time, the data transmissions interfere with one another. Hereinafter, an interference of data transmissions will be referred to as a "hidden node problem."

When data transmissions from stations A and B, which have a hidden node relationship, collide with each other while being transmitted to the coordinator, the data is retransmitted based on an automatic repeat request (ARQ) mechanism. Consequently, data throughput deteriorates due to the data retransmission.

When a hidden node exists in a network, collision of data transmissions occurs very frequently. In same cases, 30 to 40% of data throughput deterioration is due to frequent collision of data transmissions.

Accordingly, an effective method for transmitting data is required to solve the hidden node problem.

FIG. 2 is a timing diagram illustrating a method of solving a hidden node problem by transmitting request to send/clear to send (RTS/CTS) commands to a PLC network before transmitting data during data communication between stations. The RTS/CTS commands are used to reserve a transmission medium in the PLC network before transmitting the actual data.

Before transmitting the data to a receiving station, a transmitting station transmits the RTS command to the PLC network. Upon receiving the RTS command, the receiving station transmits the CTS command to the PLC network. After transmitting the RTS command, the transmitting station transmits the actual data to the receiving station. Also, when data transmission is completed, the receiving station transmits an ACK command to the transmitting station and the PLC network to notify them of the completion of data transmission.

When other stations, besides the transmitting and receiving stations, receive the RTS/CTS commands, the other stations perform virtual carrier sense (VCS) until the data transmission has been completed in order to maintain data transmission standby status. In other words, stations in the PLC network, other than the transmitting and receiving stations, maintain standby status (referred to as "deferred access status") and wait to transmit data after the completion of data transmission between the transmitting and receiving stations. Here, the VCS denotes standing by until the corresponding data transmission is completed.

Referring to FIG. 2, a deferred access period of a station that has received the RTS command begins from the point when the station receives the RTS command and continues to the point when the VCS of the station and an inter frame space (IFS) are complete. Here, the VCS of the station is performed from the point when the transmitting station transmits the RTS command to the station to the point when the receiving station transmits an acknowledgement (ACK) command to the station. After the deferred access period of the station, other stations, other than the transmitting and receiving stations which received the RTS command, can transmit data.

Referring to FIG. 2, deferred access period of a station that has received the CTS command begins from the point when the station receives the CTS command and continues to the point when the VCS of the station and an IFS are complete. Here, the VCS of the station is performed from the point when the transmitting station transmits the CTS command to the station to the point when the receiving station transmits the ACK command to the station. After the deferred access period of the station, other stations, other than the transmitting and receiving stations which received the CTS command, can transmit data.

As described above, by transmitting the RTS/CTS commands to the PLC network before the actual data transmission, the other stations, besides the transmitting and receiving stations, maintain a deferred access status, thereby preventing interference of data transmissions due to hidden nodes. Particularly when data throughput is not an important matter, using the RTS/CTS commands can be very useful in solving hidden node problems. However, using the RTS/CTS commands may come at the cost of data throughput in the PLC network, because the RTS/CTS commands may cause an overhead in the PLC network. Accordingly, if data throughput is important, using the RTS/CTS commands may be disadvantageous. Moreover, when data packet size is small, the data throughput deterioration caused by using the RTS/CTS commands may be larger than the data throughput deterioration caused by hidden node problems.

Accordingly, while transmitting data in the PLC network, the RTS/CTS commands coming at the cost of data throughput due to an overhead in the PLC network caused by the RTS/CTS commands should be prevented.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method and apparatus for transmitting data in a power line communication PLC network where RTS/CTS commands are selectively transmitted to the PLC network before transmitting the data only when the data has a size larger than a predetermined size to prevent a problem caused by a hidden node.

The present invention also provides a method and apparatus for transmitting data in a PLC network where a data transmitting power is increased if the data transmitting quality of service (QoS) is lower than a predetermined value to prevent a problem caused by a hidden node.

The present invention also provides a method and apparatus for transmitting data in a PLC network where notification is provided to move the location of a transmitting station or the location of a hidden node when the hidden node is detected in the PLC network to prevent a problem caused by a hidden node.

According to an aspect of the present invention, there is provided a method of transmitting data, including: detecting a hidden node in a network; and transmitting RTS/CTS (request to send/clear to send) commands to the network before transmitting the data, if a hidden node is detected and a transmitting station transmits a data packet having a larger size than a predetermined size.

The method may further include transmitting the data without transmitting the RTS/CTS commands to/from the network if a hidden node is not detected or if the transmitting station transmits a data packet having a smaller size than the predetermined size.

The predetermined size may be a size that makes the data throughput deterioration caused by the RTS/CTS commands transmission larger than that caused by the hidden node if the data packet size is smaller than the predetermined size.

According to another aspect of the present invention, there is provided a method of transmitting data, including: detecting a hidden node in a network; transmitting RTS/CTS commands to the network before transmitting data if a hidden node is detected and a transmitting station transmits a data packet having a size larger than a predetermined size; stopping transmission of the RTS/CTS commands and increasing data transmitting power if the transmitting station transmits a data packet having a transmitting QoS lower than a predetermined value; detecting another hidden node in the network; and providing notification to move the location of the transmitting station or the location of another hidden node if another hidden node is detected.

The predetermined size may be a size that makes the data throughput deterioration caused by the RTS/CTS commands transmission larger than that caused by the hidden node if the data packet size is smaller than the predetermined size.

The predetermined value may be determined by a required data transmitting (QoS.

The data transmitting power is increased to a value within a range which satisfies an adopted standard.

The method may further include transmitting the data without transmitting the RTS/CTS commands to/from the network if a hidden node is not detected in the attempted detection of the hidden node, if the transmitting station transmits a data packet having a smaller size than the predetermined size, or if another hidden node is not detected in the attempted detection of another hidden node.

The method may further include transmitting the data after transmitting the RTS/CTS commands if the data packet transmitting QoS has become higher than a predetermined value.

According to another aspect of the present invention, there is provided a transmitting station, including: a hidden node detecting unit which detects a hidden node in a network; a data size comparison unit which compares a data packet size to be transmitted from the transmitting station with a predetermined size if a hidden node is detected in the network; an RTS/CTS commands switching unit which enables transmission of the RTS/CTS commands before the transmission of the data if the data packet size is larger than the predetermined size; and a data transmitting unit which transmits the data packet to a receiving station.

The predetermined size may be a size that makes the data throughput deterioration caused by the RTS/CTS commands transmission larger than that caused by the hidden node if the data packet size is smaller than the predetermined size.

According to another aspect of the present invention, there is provided a transmitting station, including: a hidden node detecting unit which detects a hidden node in a network; a data size comparison unit which compares a data packet size to be transmitted from the transmitting station with a predetermined size if a hidden node is detected in the network; an RTS/CTS commands switching unit which enables transmission of the RTS/CTS commands before the transmission of the data if the data packet size is larger than the predetermined size; a data quality comparison unit which compares a data packet transmitting QoS with a predetermined value after the enabling of the RTS/CTS commands transmission; a transmitting power adjusting unit which increases the data transmitting power if the data packet transmitting QoS is lower than the predetermined value; a notifying unit which provides notification to move the location of the transmitting station or the location of another hidden node when another hidden node is detected after the data transmitting power is increased; and a data transmitting unit which transmits the data packet to a receiving station.

The predetermined size may be a size that makes the data throughput deterioration caused by the RTS/CTS commands transmission larger than that caused by the hidden node if the data packet size is smaller than the predetermined size.

The predetermined value may be determined by a required data transmitting QoS.

The data transmitting power may be increased to a value within a range which satisfies an adopted standard.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Hereinafter, exemplary embodiments of the present invention will be described more fully with reference to the accompanying drawings.

Figure 1:
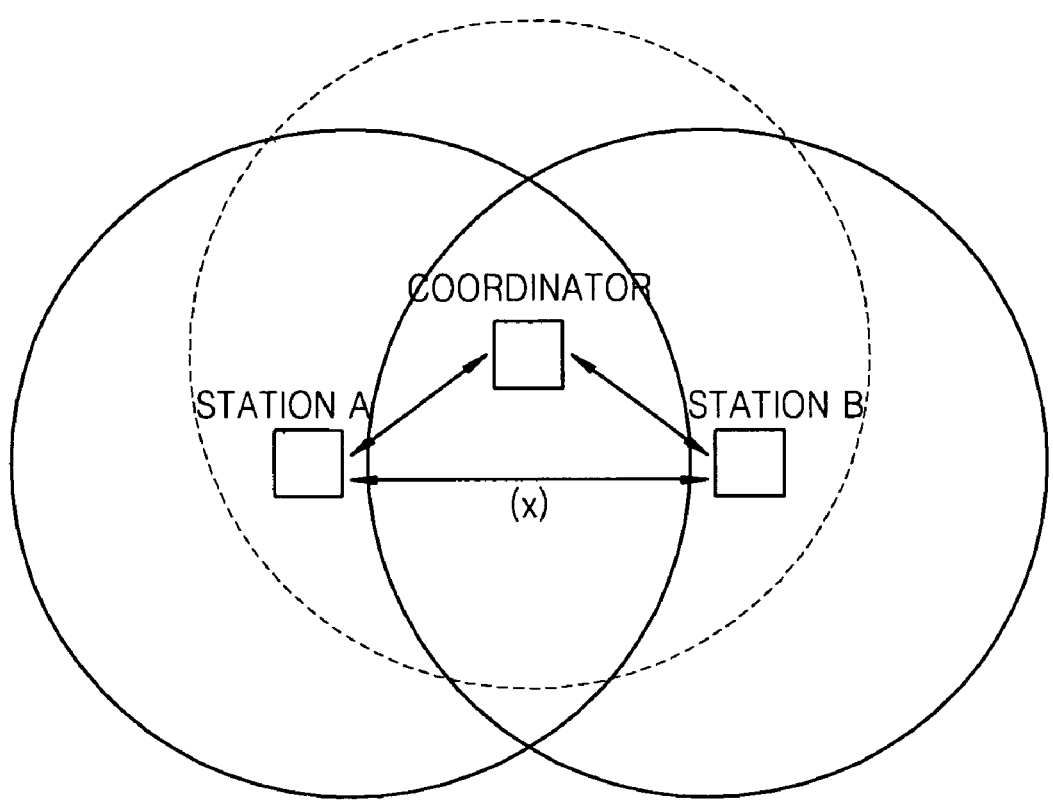
FIG. 1 is a schematic drawing illustrating related art data communication between a coordinator and stations in a PLC network.
Figure 2:
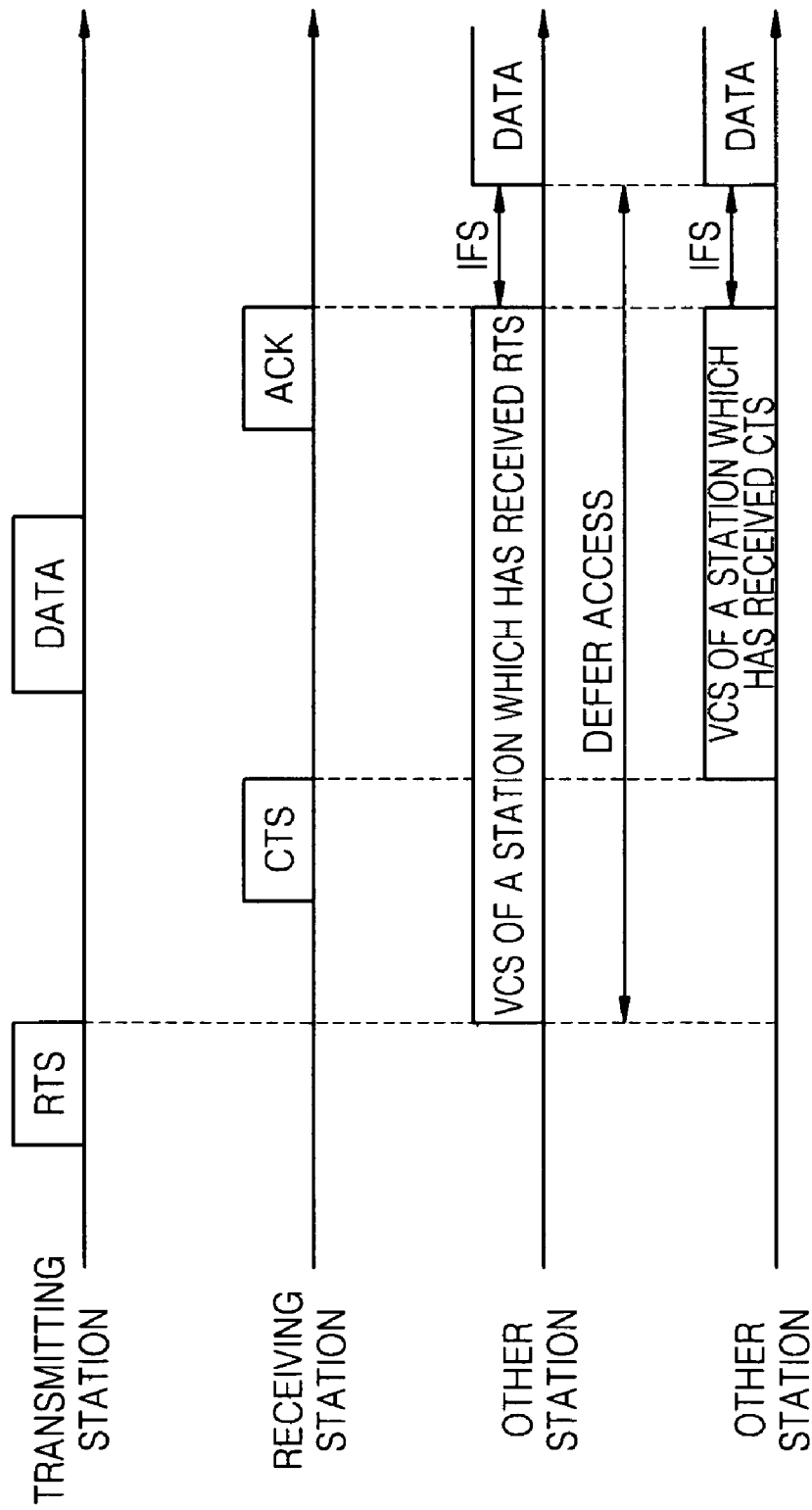
FIG. 2 is a timing diagram illustrating a related art method of solving a hidden node problem by transmitting RTS/CTS commands to a PLC network before transmitting data during data communication between stations.
Figure 3:
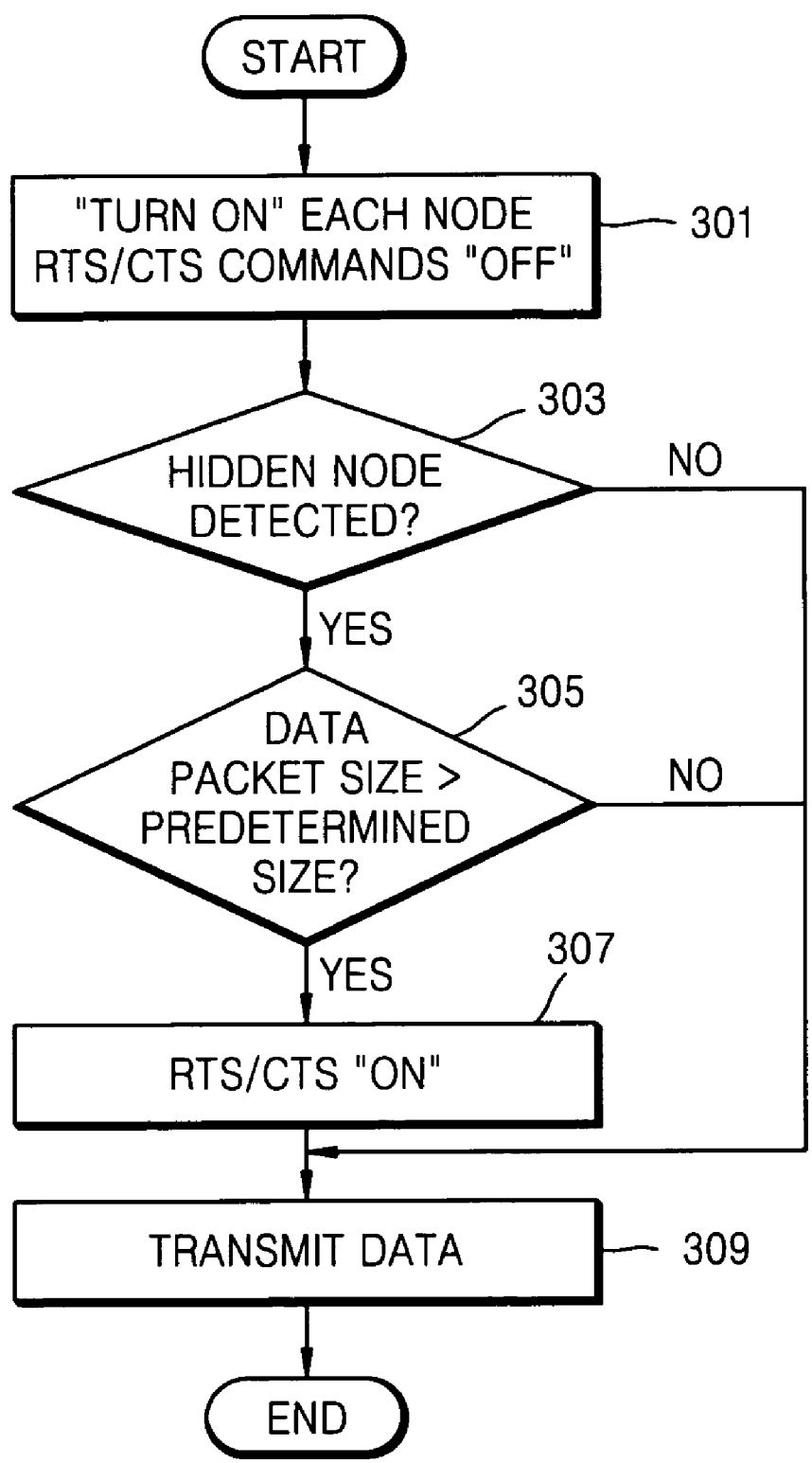
FIG. 3 is a flowchart illustrating a method of preventing a hidden node problem while transmitting data between stations in a PLC network according to an exemplary embodiment of the present invention.

FIG. 3 is a flowchart illustrating a method of preventing a hidden node problem while transmitting data between stations in a PLC network according to an exemplary embodiment of the present invention.

Referring to FIG. 3, a PLC network is formed by "turning on" each node (station) which transmits data, and RTS/CTS commands are maintained "off" as default in operation 301. Then, an attempt to detect hidden nodes in the PLC network is performed in operation 303. If a hidden node is not detected, the data is transmitted without transmitting the RTS/CTS commands in operation 309. However, if a hidden node is detected, the data packet size is compared with a predetermined size in operation 305. Here, the predetermined size comprises a size that makes the data throughput deterioration caused by the RTS/CTS commands transmission larger than that caused by the hidden node if the data packet size is smaller than the predetermined size. If the data packet size is smaller than the predetermined size, the data is transmitted without transmitting the RTS/CTS commands in operation 309. If the data packet size is larger than the predetermined size, the RTS/CTS commands are transmitted (the RTS/CTS commands are turned "on") in operation 307 before transmitting the data in operation 309.

Figure 4:
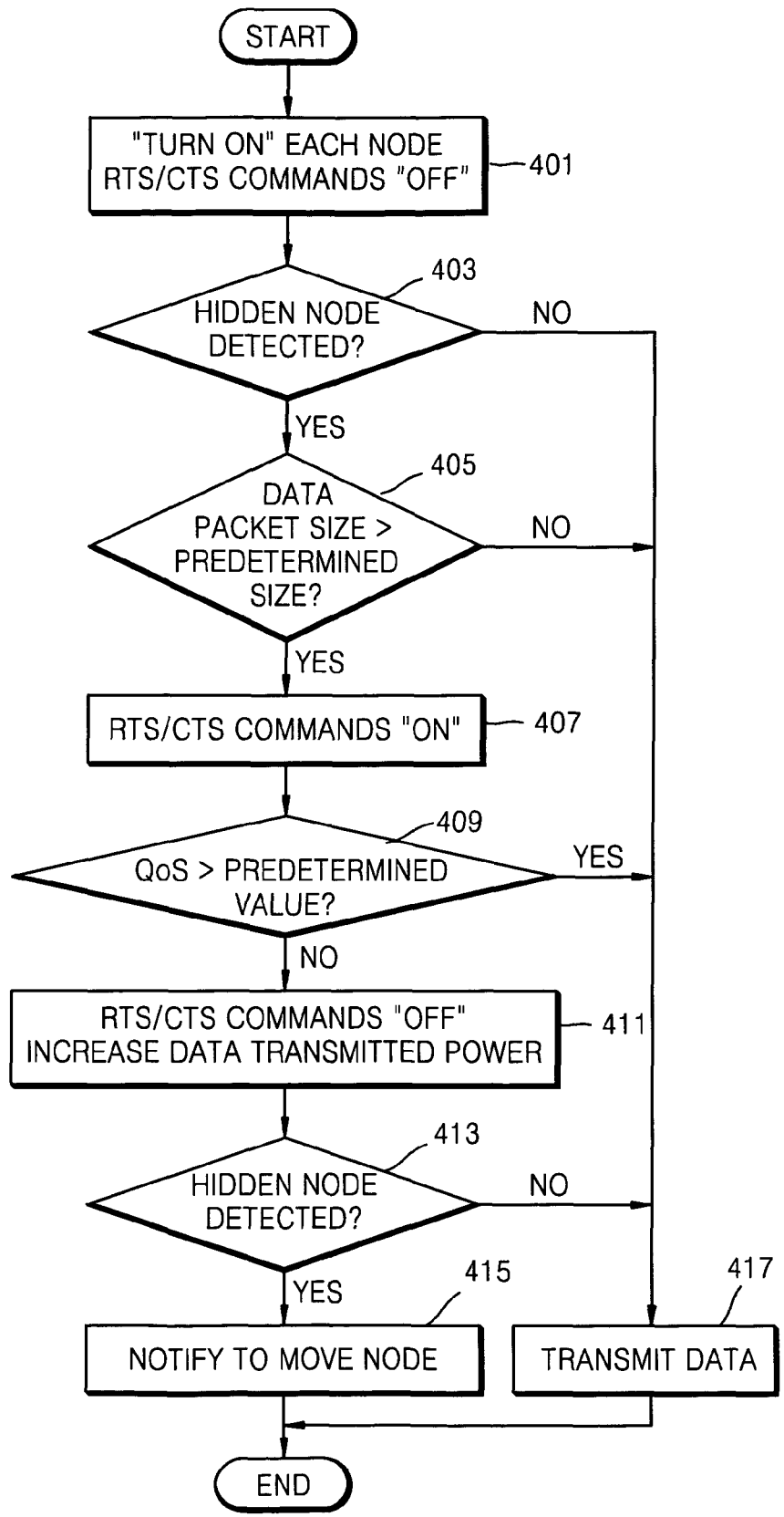
FIG. 4 is a flowchart illustrating a method of preventing a hidden node problem while transmitting data between stations in a PLC network according to another exemplary embodiment of the present invention.

FIG. 4 is a flowchart illustrating a method of preventing a hidden node problem while transmitting data between stations in a PLC network according to another exemplary embodiment of the present invention.

Referring to FIG. 4, a PLC network is formed by "turning on" each node (station) which transmits data, and RTS/CTS commands are maintained "off" as default in operation 401. Then, an attempt to detect hidden nodes in the PLC network is performed in operation 403. If a hidden node is not detected, the data is transmitted without transmitting the RTS/CTS commands in operation 417. However, if a hidden node is detected, the data packet size is compared with a predetermined size in operation 405. Here, the predetermined size includes a size that makes the data throughput deterioration caused by the RTS/CTS commands transmission larger than that caused by the hidden node if the data packet size is smaller than the predetermined size. If the data packet size is smaller than the predetermined size, the data is transmitted without transmitting the RTS/CTS commands in operation 417. If the data packet size is larger than the predetermined size, the RTS/CTS commands are transmitted (the RTS/CTS commands are turned "on") in operation 407 prior to transmitting the data. Then the data packet transmitting QoS is compared with a predetermined value in operation 409. If the data packet transmitting QoS is higher than the predetermined value, the RTS/CTS commands transmission is maintained before the data is transmitted in operation 417. However, if the data packet transmitting QoS is lower than the predetermined value, the RTS/CTS commands transmission is stopped (the RTS/CTS commands are turned "off") and data transmission power is increased in operation 411. Here, the predetermined value is determined by a required data transmitting QoS. Accordingly, if the required data transmitting QoS is high, the predetermined value is high and if the required data transmitting QoS is low, the predetermined value is low. Thus, required data packet transmitting QoS can be obtained by setting the predetermined value appropriately. If the data transmitting power is increased, the communication range of a transmitting station is increased. Accordingly, the communication reachability is increased. Through the method of the current exemplary embodiment, the hidden node can be changed into a non-hidden node. Subsequently, a hidden node problem should not occur even if the data is transmitted without transmitting the RTS/CTS commands.

After increasing the data transmitting power to increase the communication range of the transmitting station, another attempt to detect hidden nodes in the PLC network is performed in operation 413. If another hidden node is not detected, the data is transmitted without transmitting the RTS/CTS commands. However, if another hidden node is detected, nodes of the transmitting station, a receiving station, or the like are notified to be moved in operation 415. The notification to move the nodes may be performed using a light emitting diode (LED) of PLC modem or PLC related products, or a display of TV, PC, etc., such as a user interface. Through the notification it is determined whether the data transmission interference or the low transmitting QoS can be solved by moving the nodes or increasing performance of network related products, such as a PLC modem, etc.

Figure 5:
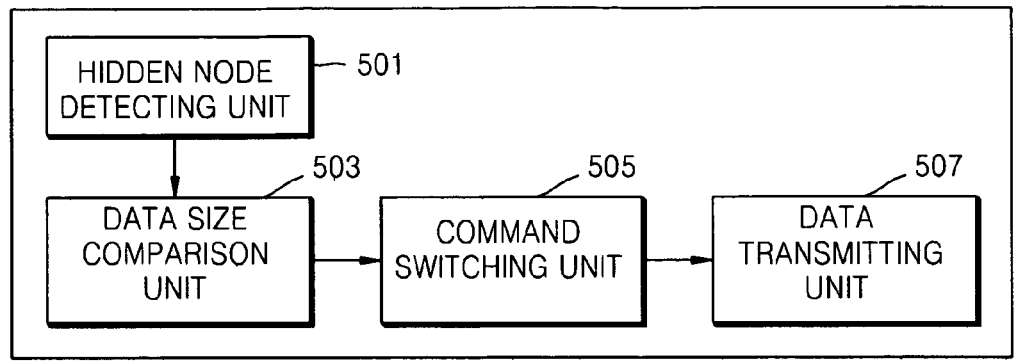
FIG. 5 is a block diagram of a transmitting station transmitting data to another station in a PLC network according to an exemplary embodiment of the present invention.

FIG. 5 is a block diagram of a transmitting station 500, transmitting data to another station in a PLC network according to an exemplary embodiment of the present invention. Referring to FIG. 5, the transmitting station 500 includes a hidden node detecting unit 501, a data size comparison unit 503, an RTS/CTS command switching unit 505, and a data transmitting unit 507.

The hidden node detecting unit 501 attempts to detect whether a hidden node exists in a PLC network. Various methods of detecting a hidden node are well known to one of ordinary skill in the art, so detailed description thereof is omitted herein. The data size comparison unit 503 compares data packet size to be transmitted from the transmitting station 500 with a predetermined size if the hidden node is detected in the network by the hidden node detecting unit 501. The RTS/CTS command switching unit 505 enables transmission of the RTS/CTS commands before the transmission of the data if the data packet size is larger than the predetermined size. Also, the data transmitting unit 507 transmits the data packet to a receiving station after the RTS/CTS commands have been transmitted.

If no hidden nodes are detected by the hidden node detecting unit 501 or if the data packet size is smaller than the predetermined size, the RTS/CTS command switching unit 505 disables the transmission of the RTS/CTS commands and the data is transmitted without transmission of the RTS/CTS commands.

Here, the predetermined size is a size that makes the data throughput deterioration caused by the RTS/CTS commands transmission larger than that caused by the hidden node if the data packet size is smaller than the predetermined size.

Figure 6:
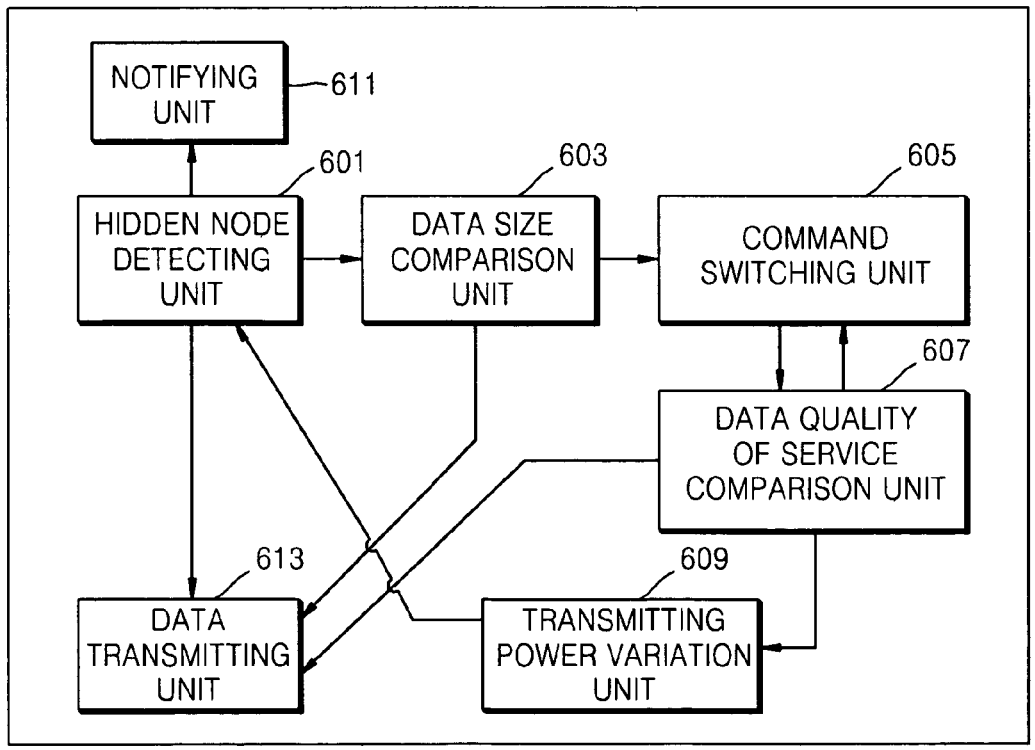
FIG. 6 is a block diagram of a transmitting station transmitting data to another station in a PLC network according to another exemplary embodiment of the present invention.

FIG. 6 is a block diagram of a transmitting station 600, transmitting data to another station in a PLC network according to another exemplary embodiment of the present invention. The transmitting station 600 includes a hidden node detecting unit 601, a data size comparison unit 603, an RTS/CTS command switching unit 605, a data quality comparison unit 607, a transmitting power adjusting unit 609, a notifying unit 611, and a data transmitting unit 613.

The hidden node detecting unit 601 attempts to detect whether a hidden node exists in a PLC network. Various methods of detecting a hidden node are well known to one of ordinary skill in the art, so detailed description thereof is omitted herein. The data size comparison unit 603 compares data packet size to be transmitted from the transmitting station 600 with a predetermined size if the hidden node is detected in the network by the hidden node detecting unit 601. The RTS/CTS command switching unit 605 enables transmission of the RTS/CTS commands before the transmission of the data if the data packet size is larger than the predetermined size. The data quality comparison unit 607 compares the data packet transmitting QoS with a predetermined value after the enabling of the RTS/CTS commands transmission.

The transmitting power adjusting unit 609 increases the data transmitting power if the data packet transmitting QoS is lower than the predetermined value. At this time, the RTS/CTS command switching unit 605 disables (turns "off") the RTS/CTS commands so that the RTS/CTS commands are not transmitted before the data is transmitted.

The notifying unit 611 provides notification to move the location of the transmitting station 600 or the location of another hidden node if the other hidden node is detected by the hidden node detector 601 after the data transmitting power is increased. Finally, the data transmitting unit 613 transmits the data packet to a receiving station.

Here, the predetermined size is a size that makes the data throughput deterioration caused by the RTS/CTS commands transmission larger than that caused by the hidden node if the data packet size is smaller than the predetermined size. The predetermined value is determined by a required data transmitting QoS. Also, the data transmitting power is increased to fall within a range which satisfies an adopted standard.

If a hidden node is not detected by the hidden node detecting unit 601 or if the data packet size is smaller than the predetermined size, the RTS/CTS command switching unit 605 disables the RTS/CTS commands transmission, and the data is transmitted without transmitting the RTS/CTS commands to the PLC network. In addition, if the data transmitting QoS is higher than the predetermined value, the RTS/CTS command switching unit 605 enables the RTS/CTS commands transmission while transmitting the data to the PLC network.

According to the exemplary embodiments of the present invention, by transmitting RTS/CTS commands to a PLC network before transmitting data dependant on the transmitted data packet size, a data collision and a low data throughput caused by a hidden node can be prevented.

Also, by increasing data transmitting power based on the data transmitting QoS, interference of data transmissions and a low data transmitting QoS caused by a hidden node can be prevented.

Lastly, by providing notification to move the location of a transmitting station or the location of a hidden node if the hidden node is detected in the PLC network, interference of data transmissions and a low data transmitting QoS caused by a hidden node can be prevented. Also, reasons for a low data throughput and a low data transmitting QoS can be easily ascertained.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of transmitting data, the method comprising:
   attempting, by a hidden node detecting unit, to detect a hidden node in a network;
   transmitting at least one of a request to send (RTS) command and a clear to send (CTS) command to the network before transmitting data if the hidden node is detected and a transmitting station transmits a data packet having a size which is larger than a predetermined size;
   stopping transmission of the at least one of the RTS command and the CTS command and increasing data transmitting power if the transmitting station transmits a data packet having a transmitting quality of service (QoS) which is lower than a predetermined value;
   attempting to detect another hidden node in the network; and
   providing notification to move one of a location of the transmitting station and a location of the other hidden node if the other hidden node is detected.

2. The method of claim 1, wherein the predetermined size is a size that makes the data throughput deterioration caused by the transmitting of the at least one of the RTS command and the CTS command larger than a data throughput deterioration caused by the hidden node if the data packet size is smaller than the predetermined size.

3. The method of claim 1, wherein the predetermined value is determined by a required data transmitting QoS.

4. The method of claim 1, further comprising transmitting the data without transmitting the at least one of the RTS command and the CTS command if the hidden node is not detected, if the transmitting station transmits a data packet having a size which is smaller than the predetermined size, or if the other hidden node is not detected.

5. The method of claim 1, further comprising transmitting the data after transmitting the at least one of the RTS command and the CTS command if the transmitting QoS of the data packet is higher than the predetermined value.

6. A transmitting station comprising:
   a hidden node detecting unit which attempts to detect a hidden node in a network;
   a data size comparison unit which compares a size of a data packet to be transmitted from the transmitting station with a predetermined size if the hidden node is detected in the network by the hidden node detecting unit;
   a command switching unit which enables transmission of at least one of a request to send (RTS) command and a clear to send (CTS) command before the data packet is transmitted if the size of the data packet is larger than the predetermined size;
   a data quality comparison unit which compares a data packet transmitting quality of service (QoS) with a predetermined value after enabling of the transmission of the at least one of the RTS and the CTS command transmission;
   a transmitting power adjusting unit which increases a data transmitting power if the data packet transmitting QoS is lower than the predetermined value;
   a notifying unit which provides a notification to move one of a location of the transmitting station and a location of another hidden node if the other hidden node is detected after the data transmitting power is increased; and
   a data transmitting unit which transmits the data packet to a receiving station.

7. The transmitting station of claim 6, wherein the predetermined size is a size that makes a data throughput deterioration caused by the transmission of the at least one of the RTS command and the CTS command larger than a data throughput deterioration caused by the hidden node if the size of the data packet is smaller than the predetermined size.

8. The transmitting station of claim 6, wherein the predetermined value is determined by a required data transmitting QoS.

* * * * *